United States Patent [19]

Monaco

[11] Patent Number: 5,661,962

[45] Date of Patent: Sep. 2, 1997

[54] THATCHING ATTACHMENT FOR A ROTARY POWER MOWER

[76] Inventor: John A. Monaco, 2529 W. Cactus Rd., Phoenix, Ariz. 85029

[21] Appl. No.: 433,547

[22] Filed: May 3, 1995

[51] Int. Cl.$^6$ .................................................. A01D 57/12
[52] U.S. Cl. .................... 56/16.9; 56/255; 56/295
[58] Field of Search ................... 56/16.9, 295, 255, 56/400, 12.7; 15/49.1, 40

[56]     References Cited

U.S. PATENT DOCUMENTS

| | | |
|---|---|---|
| 1,118,870 | 11/1914 | Lane ............................. 15/49.1 X |
| 1,715,060 | 5/1929 | Dornhecker ................... 15/49.1 X |
| 2,684,495 | 7/1954 | Litkenhous ....................... 15/49.1 |
| 2,863,162 | 12/1958 | Draughon . |
| 3,045,267 | 7/1962 | Wagner . |
| 3,051,972 | 9/1962 | Lacy . |
| 3,133,398 | 5/1964 | Tatum . |
| 3,399,519 | 9/1968 | Buchanan ............................ 56/295 |
| 3,611,691 | 10/1971 | Howard . |
| 3,724,182 | 4/1973 | Long et al. . |
| 3,742,688 | 7/1973 | Tonjes, Jr. . |
| 3,753,341 | 8/1973 | Berg, Jr. et al. . |
| 3,837,157 | 9/1974 | Van Der Lely .................. 56/16.9 X |
| 3,918,242 | 11/1975 | Harris . |
| 4,263,771 | 4/1981 | Iaboni et al. ..................... 56/16.9 X |
| 4,578,938 | 4/1986 | Genesco ............................... 56/295 |
| 5,274,987 | 1/1994 | Wiener ........................... 56/295 X |
| 5,477,580 | 12/1995 | Buysse ............................ 15/49.1 X |

*Primary Examiner*—Terry Lee Melius
*Assistant Examiner*—Christopher J. Novosad
*Attorney, Agent, or Firm*—Michael J. Tavella

[57]    ABSTRACT

A thatching attachment for lawn mowers that uses a pair of nylon bristle brushes that mount to a power mower. These soft brushes tend to vibrate the turf rather than tear it. Because the bristles are soft, compared to metal tines, there is no possibility that the turf can be torn up, even at high mower speeds or if the mower is stopped in one place for a short time. A second embodiment of the device uses a "U" shaped mounting bar to mount the brushes. This mounting bar allows the regular mower blade to be used as a vacuum to pick up debris and grass pulled out by the thatching process. The regular mower blade pulls the debris up and disposes of it through the discharge chute on the mower where it can be bagged and subsequently discarded.

4 Claims, 5 Drawing Sheets

5,661,962

THATCHING ATTACHMENT FOR A ROTARY POWER MOWER

This invention relates to thatching attachments for rotary power mowers mid particularly to thatching attachments for a rotary power mowers using bristle brushes.

BACKGROUND OF THE INVENTION

Lawn care is a major business in the United States. Every year, billions of dollars are spent on feeding, mowing, and grooming lawns. One of the most common lawn care tasks is the spring thatching of the lawn. In the spring, the turf tends to be matted down after the winter snowfall. The underlying soil is packed tightly, reducing proper drainage (the packed soil does not allow water to percolate through to the grass roots) and preventing the proper movement of air through the lawn. Leaves and other debris also cover the lawn. Thatching is a process that removes the debris from the lawn, opens the blades of grass, and when done properly, aerates and loosens the underlying soil. Thatching promotes faster growth in the lawn, improving its appearance and health.

There are many products used to thatch lawns. A hand rake may be used, but besides being very strenuous, the results are, at best, superficial. Several power rakes have been developed that make the work less toilsome. These power rakes also tend to do a more thorough job in cleaning the lawn and in aerating the soil Examples of these devices are found in U.S. Pat. Nos. 3,611,691 to Howard; 3,724,182 to Long et al., 3,742,688 to Tonjes, Jr.; 3,753,341 to Berg, Jr. et al.; 3,918,242 to Harris; and 4,578,938 to Genesco. Howard teaches a rake attachment for power mowers. The primary purpose of this device is to rake the cuttings from a lawn during the cutting process. It can also be used to pick up debris. The Howard device has a number of tines bolted to a blade. There are three tines placed at the outer edges on each side of the blade (six tines in all). The tines work the turf in the same mariner as a hand rake, except that the tines are driven by an engine. The Long et al. design has a pair of oppositely disposed paddles bolted on the ends of a blade for mowers. The Long et al design is intended as a leaf, grass or loose snow blower. Moreover, Long teaches the addition of tines that act as a scarifying member to renovate lawns. The Tonjes, Jr. patent teaches a pair of oppositely disposed hinged tooth carriers. These carriers are held in position by aerodynamic force. Again, tines are used to work the turf. The hinges allow the tines to be moved if a hard object is hit. The Berg, Jr., et al., patent leaches use of a pair of polyethylene rake units that are mounted on a form that is used in place of a blade. Finally, the Harris design uses a pair of tine units to rake the grass. Here, the tines can rotate from a retracted position to an extended position as the blade, on which the tines are mounted, rotates.

All of these inventions have one common problem: they all use some form of metal tine system, similar to that of a hand rake. These tines, when attached to a power mower tend to rip the turf as the power mower turns the blades. Hand raking uses similar tines, but there is no way for a person to exert the force that a power mower can exert and there is no way a person can match the speed at which the tines contact the grass. Of course, if the device is not set properly, e.g., too low, the tines dig the turf up, perhaps killing it in spots. Even at low speeds, the metal tines on these blades do more damage than a hand rake ever could do.

SUMMARY OF THE INVENTION

The present invention overcomes these difficulties. It uses a pair of nylon bristle brushes that mount to the power mower. These soft brushes tend to shake or vibrate the turf rather than tear it. As the brushes vibrate the turf, old grass is forced upward. Moreover, the vibrating/sweeping action of the brushes loosens up the underlying soil, aerating and creating room for good root growth. The vibrating action also causes seed that is not germinated to be planted, causing new growth.

Because the bristles are soft, compared to metal tines, there is no possibility that the turf can be torn up, even at high mower speeds or if the mower is Stopped in one place for a short time.

A second embodiment of the device uses a "U" shaped mounting bar to mount the brushes. This mounting bar allows the regular mower blade to be used as a vacuum device to pick up debris and grass pulled out by the thatching process. The regular mower blade pulls the debris up and disposes of it through the discharge chute on the mower where it can be bagged and subsequently discarded.

It is an object of this invention to produce a thatching device for a power lawn mower that thatches a lawn using bristle brushes.

It is an other object of this invention to produce a thatching device for a power mower that does not use metal tines that can tear up a lawn.

It is yet another object of this invention to produce a thatching device for a power mower that loosens the soil as it operates.

It is a further object of this invention to produce a thatching device for a power mower that allows loose seed to be activated as it operates over the lawn.

It is yet another object of this invention to produce a thatching device for a power mower that does not tear the turf as it thatches.

DETAILED DESCRIPTION OF THE INVENTION

Figure 1:
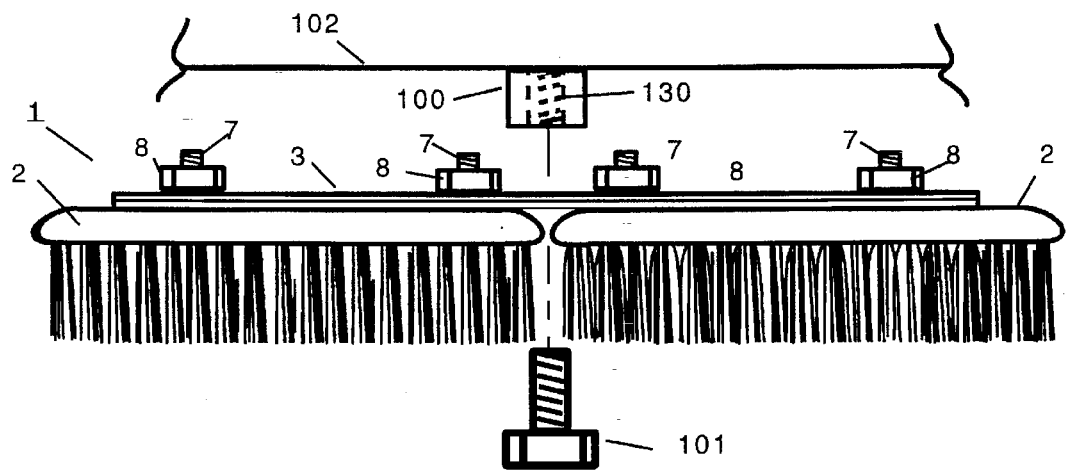
FIG. 1 is a side view of the first embodiment.

Referring now to FIG. 1, the first embodiment of the device is shown. In this embodiment, a brush assembly 1 is attached to a power mower. The brush assembly 1 has three main components: two nylon bristle brushes 2 find a mounting bar 3. The brush assembly 1 is attached to the mower drive shaft 100 in the normal manner as a cutting blade. For example many mowers have a drive shaft 100 that has internal threads 130 to receive a bolt 101. The blade is held in place by the bolt 101. The drive shaft 100 sits under the mower deck 102 as shown.

To operate the brush assembly 1, the bolt 101 is removed, the cutting blade is removed, and the brush assembly 1 is installed. The hole 4 on the mounting bar 3 is used to attach the brush assembly 1 to the mower drive shaft 100. The bolt 101 is then replaced and the mower is ready for use. Of course, other mower systems are available and the mounting bar 3 may be configured to adopt to these models as well. This is not difficult and should be readily within the skill of one in the art.

Figure 2:
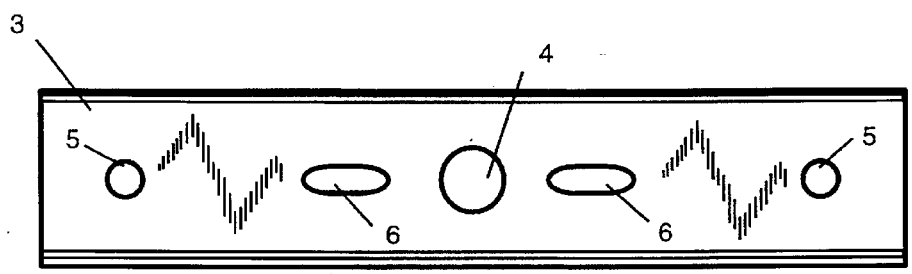
FIG. 2 is a top view of the brush mounting bar.
Figure 3:
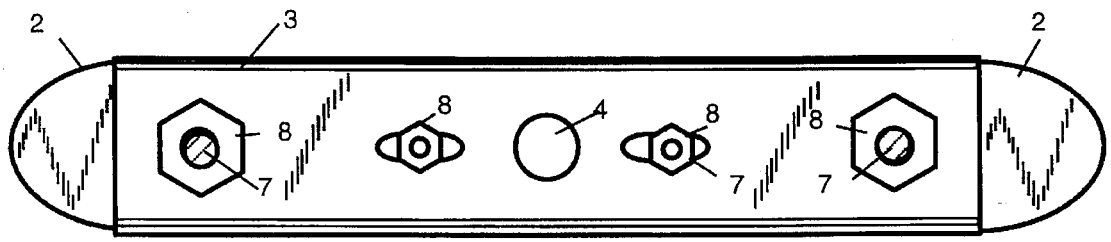
FIG. 3 is a top view of the brush mounting bar with the brushes attached.

Referring now to FIG. 2, the mounting bar 3 has mounting holes 5 and slots 6 to attach the brush units 2 to the mounting bar 3. Ordinary bolts 7 and nuts 8 are used to fasten the brushes 2 to the mounting bar 3. See FIG. 3. The slots 6 allow placement of the brushes 2 to be adjustable, as desired.

Figure 4:
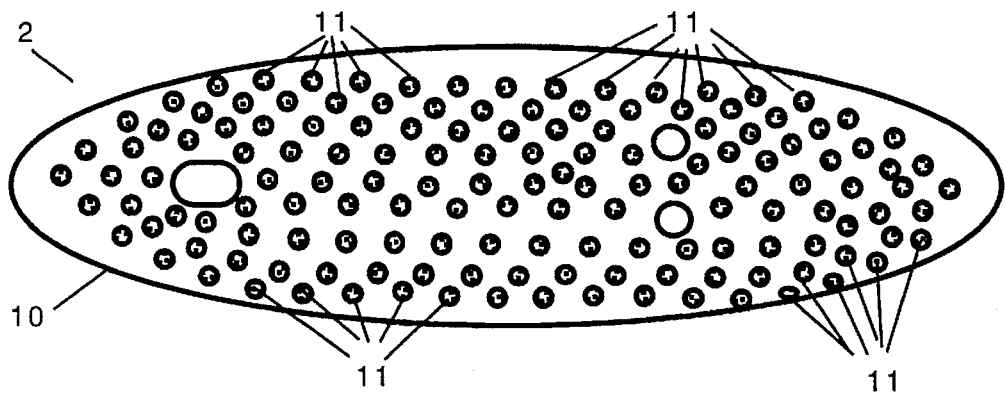
FIG. 4 is bottom view of brush unit.
Figure 5:
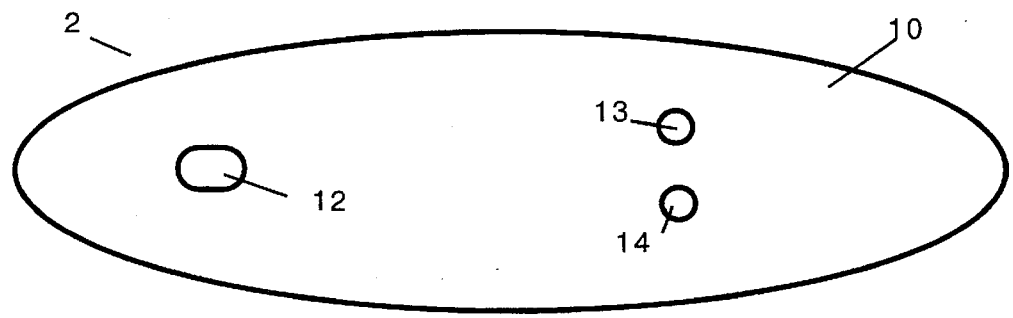
FIG. 5 is a top view of the brush unit of the first embodiment.
Figure 6:
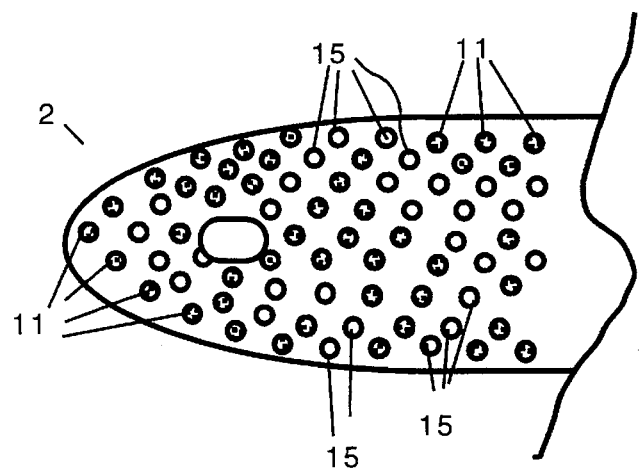
FIG. 6 is a detail of brush unit of the first embodiment with bristle sections removed.

Referring now to FIGS. 4, 5, and 6, details of the brushes 2 are shown. The brush 2 has a solid top 10 made of wood or plastic. A number of bristle groups 11 are attached to the top 10 to form the brush 2. In the preferred embodiment, nylon bristles are preferred. However, other similar types of bristles, such as vinyl, polypropylene, or other synthetic bristles may be used. Lightweight wooden or straw bristles maybe used as well.

A slot 12 and two mounting holes 13 and 14 are formed into the top 10 as shown. The slot 12 is aligned with the hole 5 in the mounting plate 3. The slot 12 permits the brush 2 to be properly aligned on the mounting bar 3. The holes 13 and 14 align with the slot 6 on the mounting bar 3. When the brush 2 is mounted to the mounting bar 3, the user chooses either hole 13 or 14 to align with slot 6. This permits the brush 2 to be angled as desired to better match the direction of rotation of the drive shaft 100. FIG. 6 shows the preferred bristle configuration. In FIG. 6, several of the bristle groups 11 have been removed from the brush 2. The resulting spaces are identified as reference numeral 15. By removing some of the bristle groups 11 from the brush 2, performance of the device is improved. Removing some bristle groups 11 opens the area of the bristles of the brush 2, thereby reducing the clogging of the brushes 2 with grass and debris.

Figure 7:
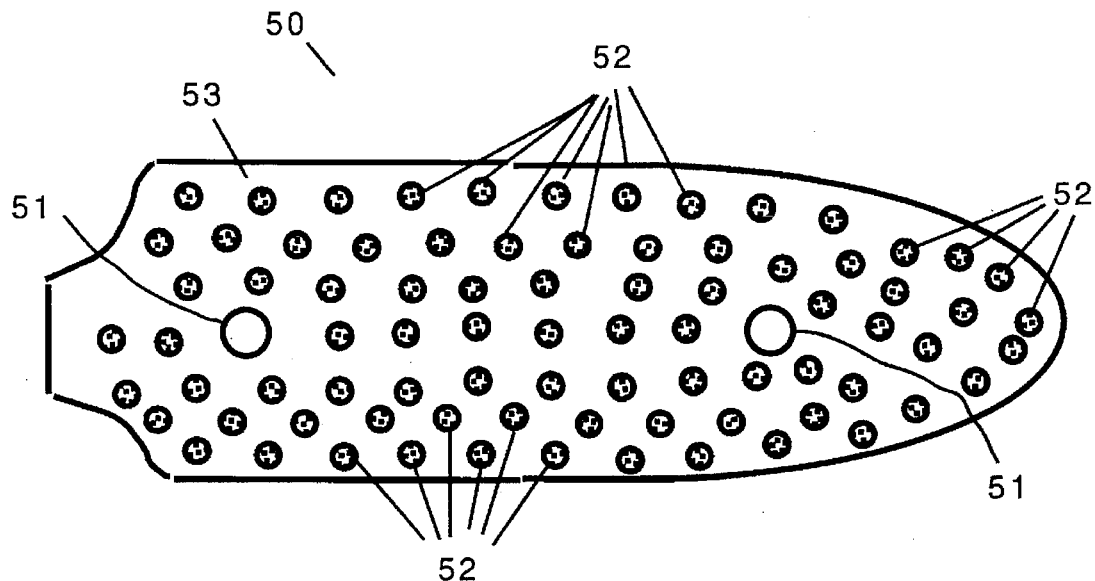
FIG. 7 is a top view of the brush unit of the second embodiment.
Figure 8:
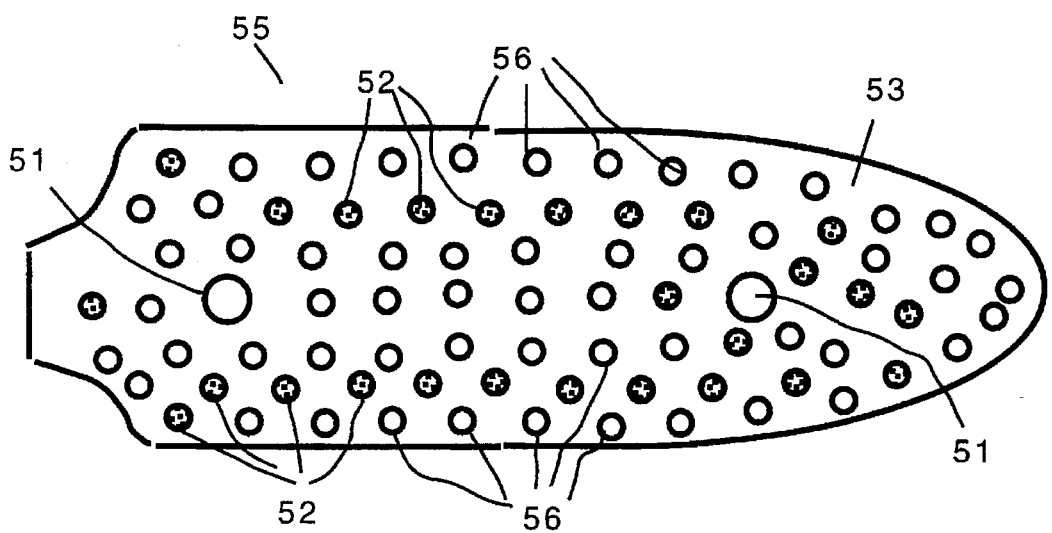
FIG. 8 is a detail of brush unit of the second embodiment with bristle sections removed.

Referring now to FIGS. 7 through 13, a second embodiment of the invention as shown. FIG. 7 shows a small brush unit 50. This brush unit 50 has a smaller, more contoured shape, as shown. The small brush unit 50 has a formed top 53, that has two mounting holes 51 as shown. A number of bristle groups 52 are attached to the formed top 53 as shown. FIG. 8 shows the second style of small brush unit 55 that has a number of bristle groups 52 removed, as in the first embodiment. The spaces on brush unit 55 are identified as 56.

Figure 9:
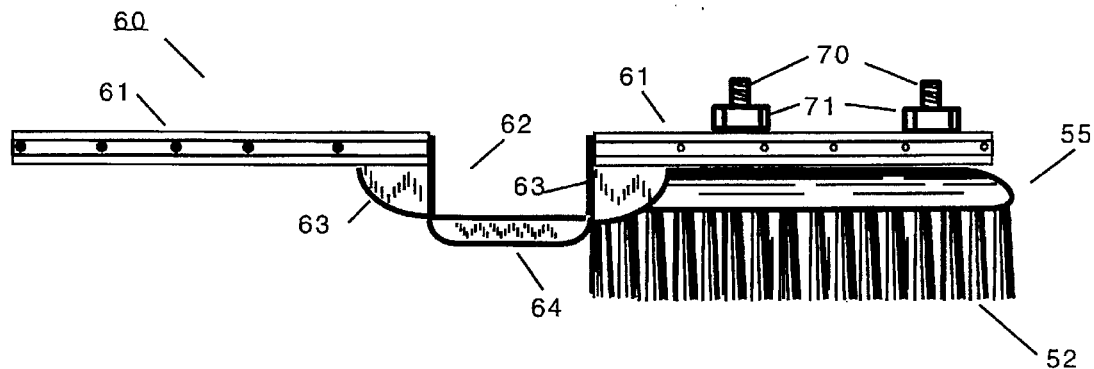
FIG. 9 is a side view side view of the second embodiment.
Figure 10:
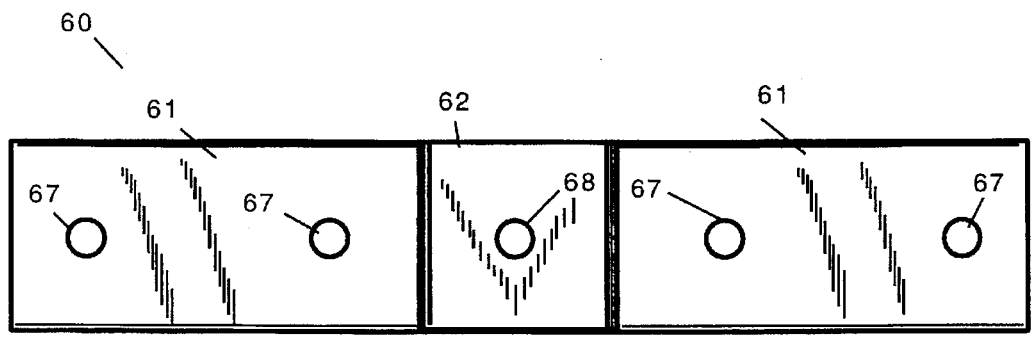
FIG. 10 is a top view of the brush mounting bar for the second embodiment.

Referring to FIGS. 9 and 10, a second mounting bar 60 is shown. Here, mounting bar 60 has two extension arms 61. The extension arms 61 are connected by a "U" shaped member 62. The "U" shaped member 62 acts as a spacer for the second mounting bar 60. The "U" shaped member can also be thought of as a means for connecting the extension arms 61. The "U" shaped member also incorporates a means for removably attaching the extension arms to the lawn mower's drive shaft such that a flat cutting blade can be mounted above the "U" shaped member at a right angle with respect to the extension arms. See, e.g., FIGS. 12 and 13.

Figure 12:
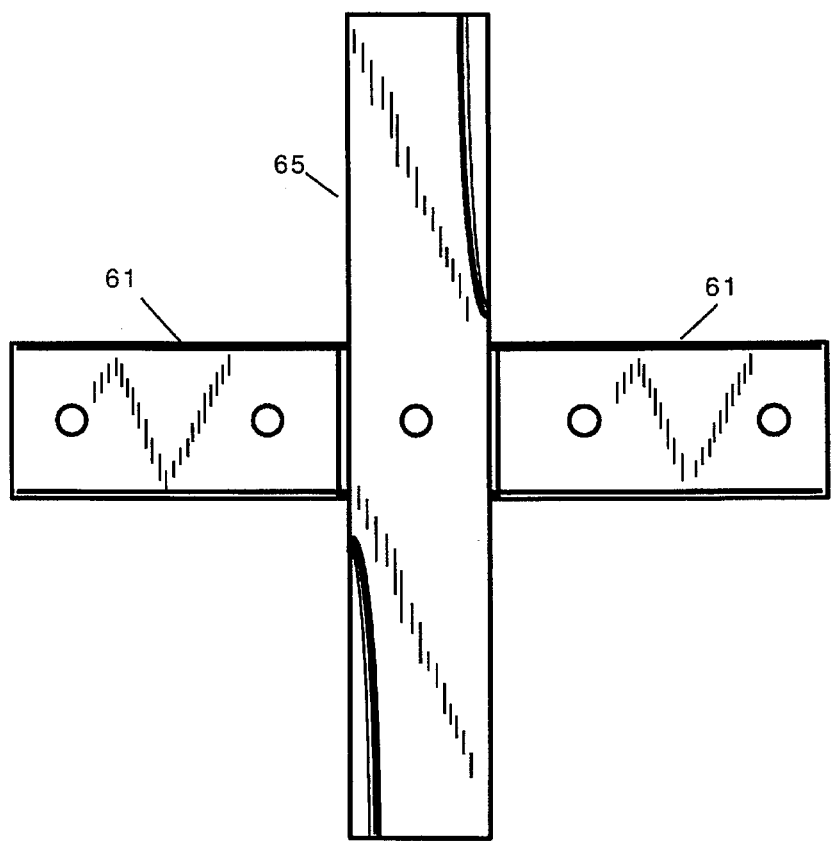
FIG. 12 is a top view of the second embodiment mounted with a standard lawn mower blade.
Figure 13:
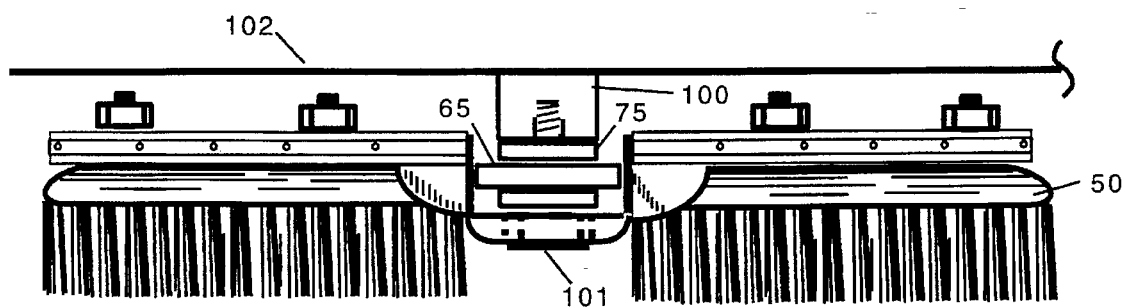
FIG. 13 is a side view showing the second embodiment with the brush attachment of the second embodiment installed and the cutting blade in place.

The space created by the "U" shaped member 62 accommodates a standard mower cutting blade 65 (see FIGS. 12 and 13). The second mounting bar 60 has a center mounting hole 68 and mounting holes 67 to mount the brushes 50 or 55.

Figure 11:
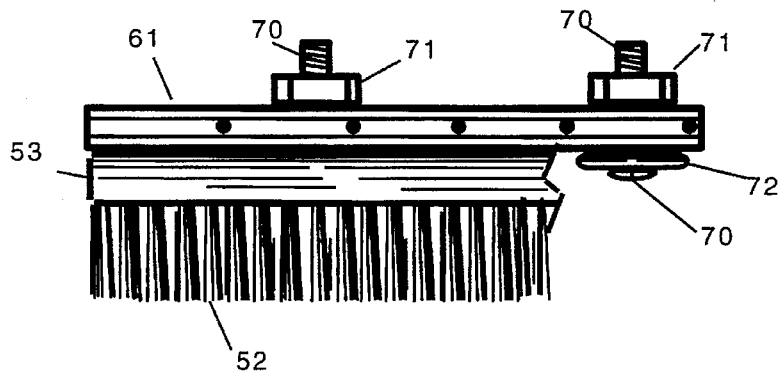
FIG. 11 is a detail view of the brush mounting assembly.

FIG. 9 shows the placement of the small brush units 55 on the second mounting bar 60. The small brush units 55 are attached to the extension arms 61 using bolts 70, nuts 71 and washers 72 as shown in FIG. 11. Two side stiffeners 63, and a bottom stiffener 64, are attached to the mounting bar 60 to ensure the mounting bar 60 remains stiff during operation.

The second mounting bar 60 and cutting blade 65 are mounted to the drive shaft 100 as before, using bolt 101. Here, the blade 65 and mounting bar 60 are stacked and are mounted at right angles. See FIGS. 12 and 13. A washer 75 provides spacing as needed.

Once in place, the mower is operated normally. The mounting bar 60 and the small brush units 55 thatch the lawn as in the first embodiment. The cutting blade 65 pulls loosened material and debris from the lawn and, acting like a vacuum cleaner, deposits this waste into the catcher bag (not shown) on the power mower. In this way, the lawn can be thatched and cleaned at the same time, eliminating the need to rake the lawn once the thatching operation is complete.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of file invention and may be subject to change by skilled persons within the scope of the invention without departing from the concept thereof.

I claim:

1. A thatching attachment for powered lawnmowers having a wheel-mounted housing, motive means mounted on said wheel-mounted housing, a vertically disposed drive shaft, and a flat cutting blade removably attached to the vertically disposed drive shaft comprising:

a) a first flat extension arm;

b) a second flat extension arm;

c) a means for connecting said first flat extension arm and said second flat extension arm, said means for connecting said first flat extension arm and said second flat extension arm incorporating a means for removably attaching said first and second flat extension arms to said vertically disposed drive shaft such that said flat cutting blade is mounted above said means for connecting said first and second flat extension arms, and such that said flat cutting blade is mounted at a right angle with respect to the first and second flat extension arms;

c) a first brush, said first brush, having a formed top portion, and a plurality of regularly spaced groups of bristles, fixedly attached to said formed top portion and extending downwardly therefrom;

d) a second brush, said second brush, having a formed top portion, and a plurality of regularly spaced groups of bristles, fixedly attached to said formed top portion and extending downwardly therefrom;

d) means for removably attaching said first brush to said first flat extension arm; and e) means for removably attaching said second brush to said second flat extension arm.

2. The thatching attachment for powered lawnmowers of claim 1 wherein a number of the plurality of regularly spaced groups of bristles on said first brush and said second brush are removed from the first brush and second brush, thereby forming spaced gaps between the plurality of group of bristles.

3. The thatching attachment for powered lawnmowers of claim 1 wherein the means for removably attaching said first brush to said first flat extension arm and said second brush to said second extension arm comprise: a series of holes formed in said first and second flat extension arms, a series of corresponding holes formed in the formed top portion of said first brush and said second brush; and fastening means, removably installed through said series of holes, for fastening the first brush and second brush to said first and flat extension arms respectively.

4. The thatching attachment for powered lawnmowers of claim 3 wherein the series of corresponding holes formed in the formed top portions of said first brush and said second brush allow for angular alignment of said first brush and said second brush, with respect to said first and second flat extension arms.

* * * * *